US009342709B2

(12) United States Patent
Warren et al.

(10) Patent No.: US 9,342,709 B2
(45) Date of Patent: May 17, 2016

(54) PATTERN DETECTION

(75) Inventors: David A. Warren, El Dorado Hills, CA (US); Bruce E. LaVigne, Roseville, CA (US)

(73) Assignee: HEWLETT-PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 13/876,586

(22) PCT Filed: Oct. 27, 2010

(86) PCT No.: PCT/US2010/054250
§ 371 (c)(1),
(2), (4) Date: Mar. 28, 2013

(87) PCT Pub. No.: WO2012/057745
PCT Pub. Date: May 3, 2012

(65) Prior Publication Data
US 2013/0191917 A1    Jul. 25, 2013

(51) Int. Cl.
*G06F 21/00* (2013.01)
*G06F 21/64* (2013.01)
*H04L 9/06* (2006.01)
(Continued)

(52) U.S. Cl.
CPC ...... *G06F 21/64* (2013.01); *G06F 9/38* (2013.01); *G06F 11/00* (2013.01); *G06F 11/30* (2013.01); *G06F 21/606* (2013.01); *H04L 9/06* (2013.01); *H04L 29/06585* (2013.01); *H04L 49/9042* (2013.01); *H04L 63/1416* (2013.01); *H04L 69/22* (2013.01)

(58) Field of Classification Search
CPC ....... G06F 21/64; G06F 21/606; H04L 69/22; H04L 29/06585; H04L 49/9042
USPC ...... 726/23; 713/150; 709/224, 230
See application file for complete search history.

(56) References Cited

U.S. PATENT DOCUMENTS 5,975,178 A * 11/1999 Otsuka et al. .......... 156/358
6,954,789 B2 * 10/2005 Dietz et al. ............ 709/224

(Continued)

FOREIGN PATENT DOCUMENTS

| CN | 101013937 | 8/2007 |
| CN | 101350049 | 1/2009 |

(Continued)

OTHER PUBLICATIONS

PCT; "Notification of Transmittal of the International Search Report and The Written Opinion of The International Searching Authority, or The Declaration": cited in PCT/US2010/054250; mailed Jun. 27, 2011.

(Continued)

*Primary Examiner* — Mohammad A Siddiqi
(74) *Attorney, Agent, or Firm* — Hewlett Packard Enterprise Patent Department

(57) ABSTRACT

Data is moved through a pipeline as processing of the data unrelated to detection of pattern is performed. The detector detects the pattern within the data at a predetermined location or based on a predetermined reference as the data is moved through the pipeline, in parallel with the processing of the data as the data is moved through the pipeline. The detector detects the pattern within the data as the data is moved through the pipeline without delaying movement of the data into, through, and out of the pipeline.

20 Claims, 4 Drawing Sheets

(51) Int. Cl.
*H04L 29/06* (2006.01)
*H04L 12/861* (2013.01)
*G06F 21/60* (2013.01)
*G06F 11/30* (2006.01)
*G06F 9/38* (2006.01)
*G06F 11/00* (2006.01)

(56) References Cited

U.S. PATENT DOCUMENTS

| | | | |
|---|---|---|---|
| 7,257,840 | B2 | 8/2007 | Ramaiah et al. |
| 7,299,282 | B2 * | 11/2007 | Sarkissian et al. ............ 709/224 |
| 7,418,732 | B2 | 8/2008 | Campbell et al. |
| 7,636,356 | B1 | 12/2009 | Melman et al. |
| 7,805,392 | B1 | 9/2010 | Steele et al. |
| 8,065,259 | B1 * | 11/2011 | Steele et al. ................... 706/48 |
| 8,095,683 | B2 | 1/2012 | Balasubramaniam |
| 8,272,056 | B2 * | 9/2012 | Sahni et al. ..................... 726/23 |
| 2004/0015712 | A1 | 1/2004 | Szor |
| 2004/0083299 | A1 * | 4/2004 | Dietz et al. .................... 709/230 |
| 2004/0199630 | A1 * | 10/2004 | Sarkissian et al. ............ 709/224 |
| 2004/0250059 | A1 * | 12/2004 | Ramelson et al. ............. 713/150 |
| 2006/0053295 | A1 | 3/2006 | Madhusudan et al. |
| 2006/0107055 | A1 | 5/2006 | Panwar et al. |
| 2006/0268703 | A1 | 11/2006 | Hautala |
| 2007/0208838 | A1 | 9/2007 | Balasubramaniam |
| 2008/0034350 | A1 | 2/2008 | Conti |
| 2008/0178294 | A1 | 7/2008 | Hu et al. |
| 2008/0189784 | A1 | 8/2008 | Mangione-Smith et al. |
| 2008/0201772 | A1 | 8/2008 | Mondaeev et al. |
| 2008/0205558 | A1 * | 8/2008 | Arnitz ............................ 375/340 |
| 2009/0016226 | A1 | 1/2009 | Lavigne et al. |
| 2009/0044276 | A1 | 2/2009 | Abdel-Aziz et al. |
| 2009/0109953 | A1 | 4/2009 | Tsang et al. |
| 2009/0129573 | A1 | 5/2009 | Gavan et al. |
| 2009/0154602 | A1 | 6/2009 | Furman et al. |
| 2009/0224801 | A1 * | 9/2009 | Lewin ............................. 326/52 |
| 2010/0095064 | A1 * | 4/2010 | Aviles ........................... 711/118 |
| 2010/0154059 | A1 | 6/2010 | McNamee et al. |
| 2010/0172355 | A1 * | 7/2010 | Szczepanek et al. ......... 370/392 |
| 2013/0019084 | A1 * | 1/2013 | Orchard et al. ............... 712/222 |
| 2014/0204248 | A1 * | 7/2014 | Kawai et al. ................. 348/246 |

FOREIGN PATENT DOCUMENTS

| | | |
|---|---|---|
| CN | 100514281 C | 7/2009 |
| WO | WO-02075339 | 9/2002 |
| WO | WO-2010050983 | 5/2010 |
| WO | WO-2011053324 | 5/2011 |

OTHER PUBLICATIONS

Sheu, T.F., et al.; "In-Depth Packet Inspection Using a Hierarchical Pattern Matching Algorithm"; Apr.-Jun. 2010; vol. 7; pp. 175-188.

Weinsberg, Y, et al.; "One Algorithm to Match Them All: On a Generic NIPS Pattern Matching Algorithm"; Conference on High Performance Switching and Routing; 2007; 7 pages.

International Preliminary Report on Patentability, International application No. PCT/US2010/043265, Feb. 7, 2013 (7 pages).

Korean Intellectual Property Office, Notification of Transmittal of the International Search Report and the Written Opinion of the International Searching Authority, or the Declaration for PCT/US2010/043265 dated Apr. 20, 2011 (10 pages).

U.S. Appl. No. 13/809,064, Non-Final Rejection dated Jun. 5, 2014, pp. 1-10 and attachments.

U.S. Appl. No. 13/809,064, Final Rejection dated Dec. 10, 2014, pp. 1-17 and attachments.

Office Action, CN Application No. 20108006985.X, Date: Apr. 9, 2014, pp. 1-9.

Office Action, CN Application No, 201080069855.X, Date: Apr. 27, 2015, pp. 1-7.

Office Action, CN Application No. 201080069855.X, Date: Oct. 20, 2015, pp. 1-10.

Tzu-Fang Sheu et al., "In-Depth Packet Inspection Using a Hierarchical Pattern Matching Algorithm," IEEE Transactions on Dependable and Secure Computing, Apr.-Jun. 2010, Issue No. 2, vol. 7, pp. 175-188, IEEE.

* cited by examiner

PATTERN DETECTION

CROSS-REFERENCE TO RELATED APPLICATION

This application is a national stage application under 35 U.S.C. §371 of PCT/US2010/054250, filed Oct. 27, 2010.

BACKGROUND

With the advent of networking technologies and the Internet, computing devices worldwide have been able to intercommunicate with one another. While this has provided numerous benefits, there have been some problems. One problem is that unwanted computer code or information, for example, computer viruses, trojans, worms, spam, etc., can more easily and undesirably spread over a large number of computing devices.

DETAILED DESCRIPTION

The spread of unwanted computer code or information has become problematic with the increasing interconnectedness of computing devices over the Internet and other networks. As a result, users and network administrators are often concerned with detecting such unwanted computer code or information. In addition users and network administrators are often concerned with detecting such unwanted computer code or information before it can be received and/or installed on or otherwise infect a given computing device or computing devices. Other times, it is not unwanted information, but interesting information, which the users and/or network administrators wish to detect and deal with in some unique way. For example, a company might wish to detect specific patterns found in confidential information, and ensure that they are not being transmitted to insecure locations. As such, unwanted computer code or information, as discussed herein, includes both types of information, including unwanted computer code or information and interesting information.

As discussed herein, a pattern detection mechanism is provided where one or more patterns may be detected within a pipeline as data moves through the pipeline without delaying movement of the data through the pipeline. Detection of a pattern may be focused at a particular location or with respect to a particular reference within a packet of data as the data moves through the pipeline. For example, the pattern may be detected within one of a plurality of layer headers, a packet payload, in a particular location or match location with respect to another pattern, etc.

As discussed herein, unwanted computer code or information will be discussed with respect to one or more patterns and/or one or more pattern portions.

Figure 1:
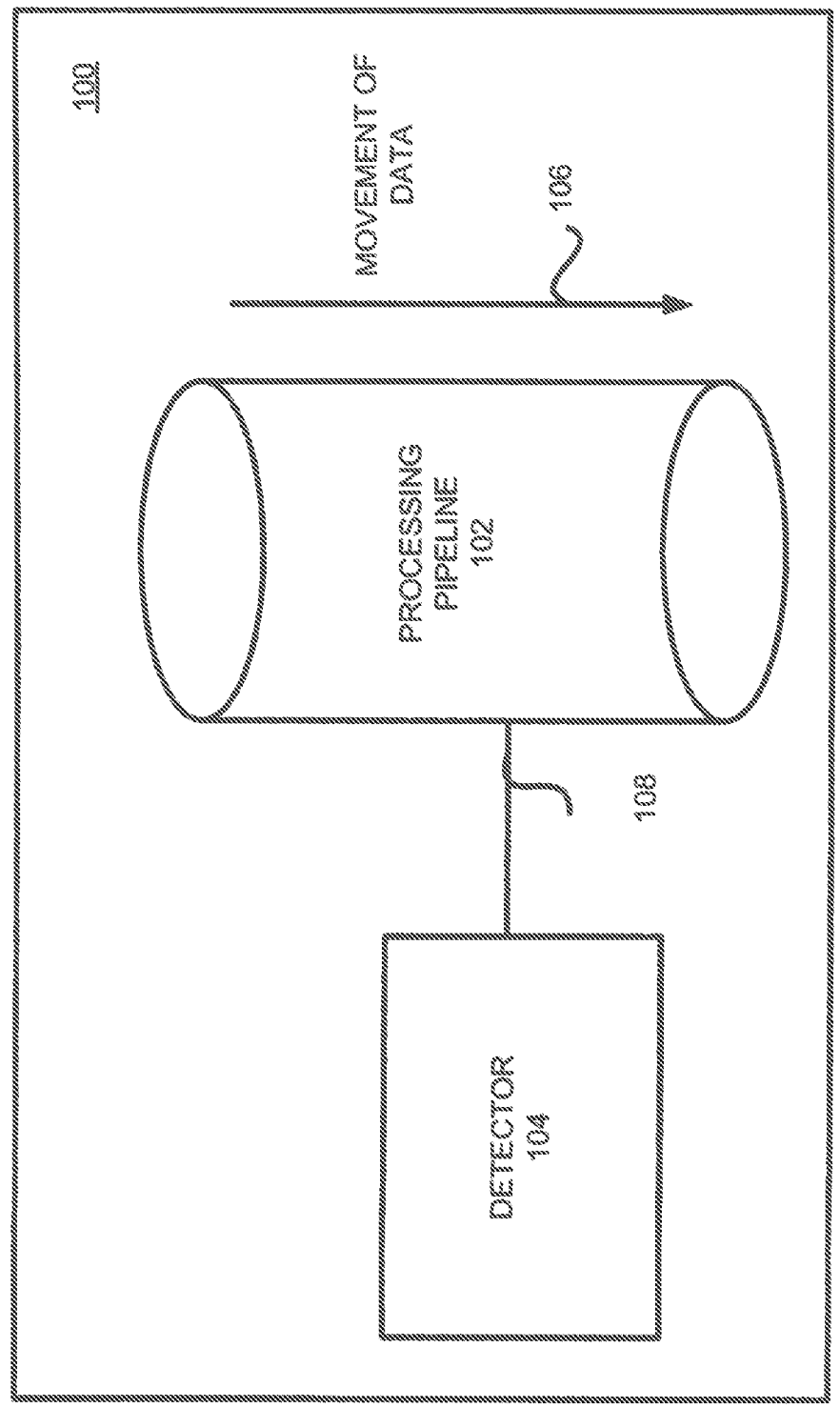
FIG. 1 is a diagram of a pattern detection device, according to an embodiment of the present disclosure.

FIG. 1 shows a representative device 100, according to an example of the disclosure. The device 100 may be a networking device, such as a switch, router, or other type of networking device. The device 100 may alternatively or additionally be a computing device, like a general purpose computer such as a server computing device, a client computing device, a desktop computer, and/or a laptop computer, among other types of computing devices.

The device 100 includes a processing pipeline 102 and a detector 104. Both the pipeline 102 and the detector 104 are implemented at least in hardware. In one example, the pipeline 102 and the detector 104 are both implemented solely in hardware, such as by using appropriate application-specific integrated circuits (ASIC's), field-programmable gate arrays (FPGA's), and other types of hardware-only components. In another example, the pipeline 102 and the detector 104 may be implemented at least in hardware in so far as they are also software that is executed by a processor (hardware) to perform their respective functionalities.

To process data within the device 100, data is moved through the pipeline 102, as indicated by the arrow 106. This processing is unrelated to pattern detection. That is, the purpose of moving the data through the pipeline 102 to perform processing on the data is unrelated to pattern detection. The processing is performed on the data as it is moved through the pipeline 102 in that the data is altered by a processing agent executed within the pipeline 102, which may control the rate at which the data moves through the pipeline 102.

For example, where the device 100 is a networking device, for example, a switch or router, the data may be incoming data packets received from outside a network to which the device 100 is a gatekeeper. The pipeline 102 may be used to modify the header information of these data packets so that the packets are transmitted to the proper devices within the network. For example, data packets relating to world-wide web (WWW) requests may be transmitted to a WWW server device on the network, data packets relating to tile transport protocol (FTP) requests may be transmitted to an FTP server device on the network, and so on.

External devices on the network can thus view the network as having a single networking address, whereas in actuality the network is made up of a number of devices having corresponding (internal) network addresses. The pipeline 102 is therefore used in this example to alter the networking addresses of incoming data packets to the internal network addresses of the devices on the network that are to handle the data packets. The modification of the networking addresses of incoming data packets to the internal network addresses is an example of the processing that can be performed on these data packets within the pipeline 102.

However, in parallel with the processing of the data as the data is moved through the pipeline 102, the detector 104 detects one or more patterns within the data as the data is moved through the pipeline 102, as indicated by the dotted line 108. The detector 104 is able to detect at least one pattern within the data as the data is moved through the pipeline 102, without delaying the movement of the data into, through, and out of the pipeline 102. The data processing that is performed in the pipeline 102 is independent of the pattern detection performed by the detector 104. Data enters, moves through, and exits the pipeline 102 without waiting for the detector 104 to perform its detection.

In this respect, the example of FIG. 1 is able to detect at least one pattern without reducing the overall performance of device 100. Furthermore, the example of FIG. 1 does not require potentially expensive and power-hungry dedicated processors for pattern detection. Rather, the detector 104 can be implemented in hardware via much lower cost hardware components that consume much less power, as compared to dedicated processors.

An additional benefit of the example of FIG. 1 is that in at least some situations, all data that enters the device 100 is moved through the pipeline 102 for processing, such that the detector 104 is capable of detecting at least one pattern within the all of the data.

Figure 2:
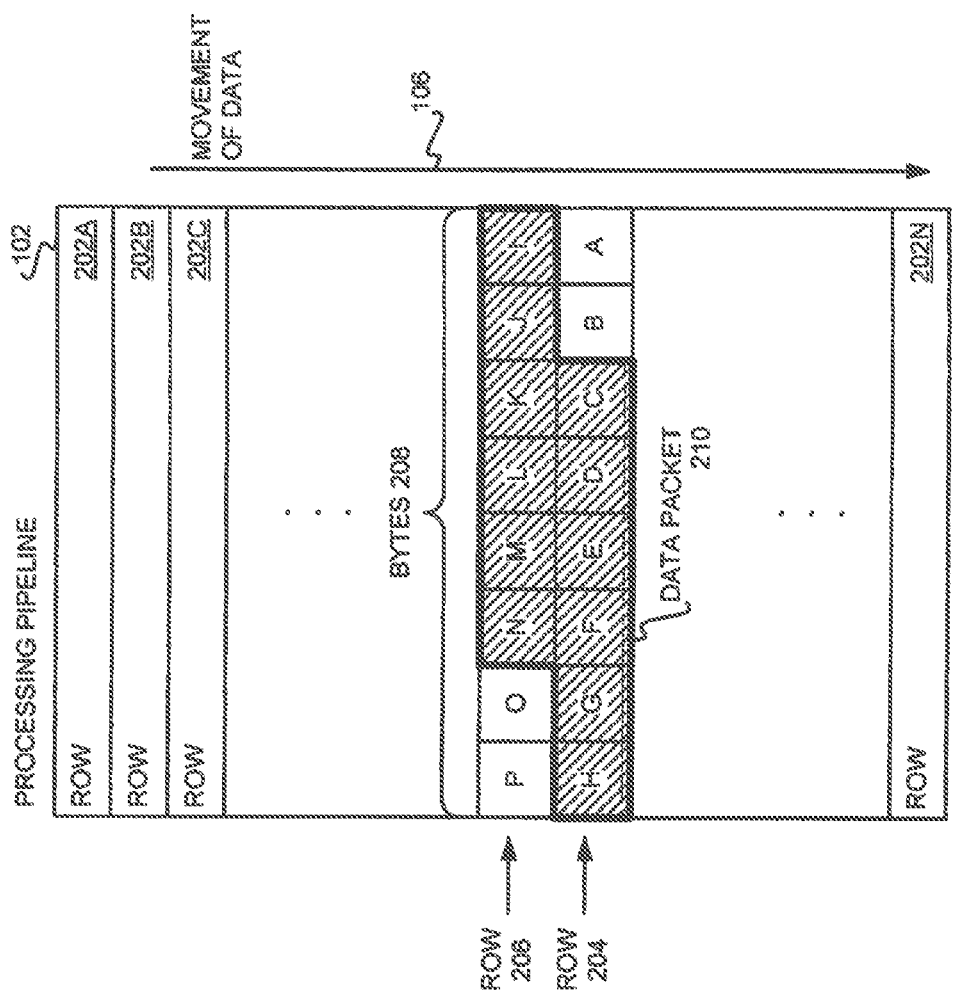
FIG. 2 is a diagram of the processing pipeline of the device of FIG. 1 in detail, according to an embodiment of the present disclosure.

FIG. 2 shows the processing pipeline 102 in more detail, according to an example of the disclosure. The pipeline 102 includes a number of rows 202A, 202B, 202C, . . . , 202N, collectively referred to as the rows 202. The rows 202 may also be referred to as the stages of the pipeline 102. The row 202A is the first row of the pipeline 102, and the row 202N is the last row of the pipeline 102. Each row 202 of the pipeline 102 stores the same number of bytes. For exemplary purposes, each row 202 stores eight bytes, However, each row 202 may store a different number of bytes, such as sixteen bytes, thirty-two bytes, and so on. The pipeline width is not limited to a power of two number of bytes.

A number of bytes of the data equal to the number of bytes that each row 202 can store enters the pipeline 102 at the first row 202A, and proceeds through the pipeline 102 on a row-by-row basis until the data exits the last row 202N, as indicated by the arrow 106. For example, the first eight bytes of data enters the pipeline 102 at the first row 202A. These first eight bytes of data then cascade down to the second row 202B, and at the same time the second eight bytes of data enter the pipeline 102 at the first row 202A. Next, the first eight bytes of data move down to the third row 202C, the second eight bytes move down to the second row 202B, and the third eight bytes of data enter the pipeline at the first row 202A. This process continues, until the first eight bytes of data enter and then exit the last row 202N of the pipeline 102, followed by the second eight bytes entering and then exiting the last row 202N, and so on.

At any given row 202 of the pipeline 102, the data may be altered, or processed. For example, as noted above, the header information of a data packet may be altered where the processing pipeline 102 is part of a gatekeeper networking device 100. For instance, the networking address A.B.C.D may be replaced with the networking address E.F.G.H. The networking address A.B.C.D specifies the external networking address of the network as a whole of which the device 100 is a part. The networking address E.F.G.H specifies the internal networking address of the device within the network that is to handle the data packet in question.

Two particular rows 204 and 206 of the rows 202 are explicitly called out in FIG. 2, in relation to which the detection of patterns by the detector 104 will be described. The row 204 includes bytes 208A, 208B, 208C, 208D, 208E, 208F, 208G, and 208H, starting with the byte 208A and ending with the byte 208H. The row 206 includes bytes 208I, 208J, 208K, 208L, 208M, 208N, 208O, and 208P, starting with the byte 208I and ending with the byte 208P. In a rudimentary example, a data packet 210 is said to be made up of twelve bytes 208C-208N, which is indicated in FIG. 2 by shading. It is noted that, in actuality, a data packet is more likely to be made up of a larger number of bytes in at least some situations.

The explicit calling out of the rows 204 and 206 and of the data packet 210 in FIG. 2 illustrates two aspects of data packets vis-à-vis the rows 202 of the pipeline 102. First, a data packet can span more than one row. The exemplary data packet 210, for instance, spans the rows 204 and 206. Second, a data packet does not have to start at the first byte of a row, nor end at the last byte of a row. The exemplary data packet 210, for instance, starts at the third byte 208C of the row 204, and ends at the sixth byte 208N of the row 206. The second byte 208B of the row 204 may be the ending byte of the previous data packet, and the seventh byte 208O of the row 206 may be the starting byte of the next data packet.

Figure 3:
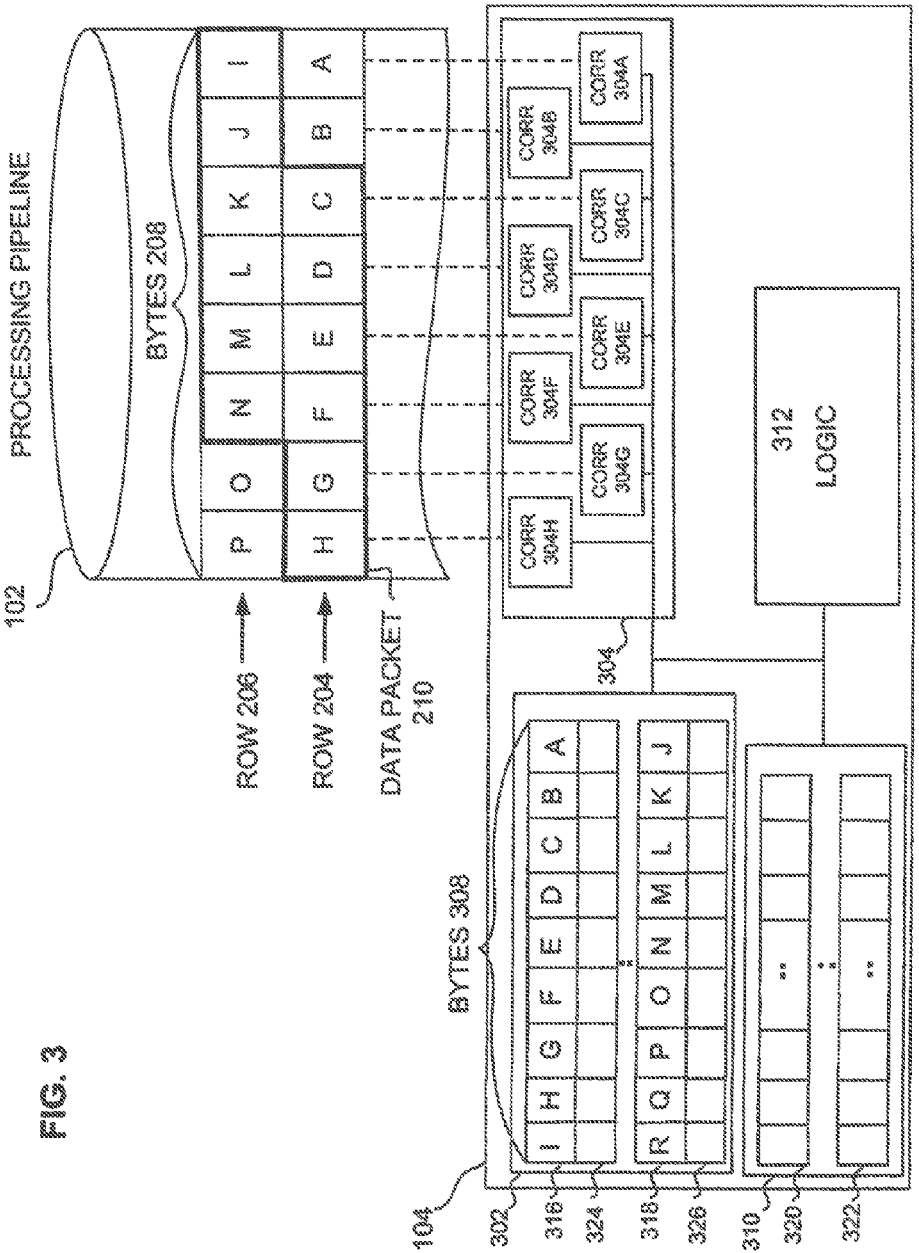
FIG. 3 is a diagram of a detector of the device of FIG. 1 in detail, according to an embodiment of the present disclosure.

FIG. 3 shows the detector 104 in more detail, according to an example of the disclosure. Furthermore, how the detector 104 can representatively detect one or more patterns in the data packet 210 spanning the rows 204 and 206 of the processing pipeline 102 is described in relation to FIG. 3. The detector 104 includes a storage 302 storing patterns 316, 318, bitmasks 324, 326, associated with patterns 316, 318 respectively, a storage 310 storing one or more sets of parameters 320, 322 associated with each of the patterns 316, 318 stored in storage 302, logic 312, and correlators 304A, 304B, 304C, 304D, 304E, 304F, 304G, and 304H, which are collectively referred to as the correlators 304. While only two patterns 316, 318 and associated bitmasks 324, 326 are depicted in FIG. 3, it may be appreciated that alternatively, only one pattern with an associated bitmask may be stored or more than two patterns with associated bitmasks may be stored. Thus, as the parameters correspond to the patterns stored in storage 302, one parameter or more than two parameters may be stored in storage 310 depending on the number of patterns stored in storage 302. The storage 302 stores one or more patterns 316, 318. Pattern 316 has bytes 308A, 308B, 308C, 308D, 308E, 308F, 308G, 308H, and 308I, which are collectively referred to as the bytes 308. The number of bytes 308 of the one or more patterns 316, 318 is independent of the number of bytes in each row 202 of the pipeline 102. In the example depicted in FIG. 3, there are nine bytes 308 in each of the patterns in storage 302 the example of FIG. 3, but in actuality there can be more or less of such bytes 308. Each of the patterns 316, 318 corresponds to one or more pattern portions. A pattern portion is a portion of pattern that is sufficient to identify this pattern with a predetermined degree of confidence. For example, where the pattern 316 corresponds to one pattern portion having the bytes 308, if all the bytes 308 are found within the data in the same sequence and with the same values, then this means that the data contains the pattern having this pattern portion with the predetermined degree of confidence.

Each bit of bytes 308 may correspond to one of two different types of bits. The first type of bit is an actual unwanted computer code or information bit having a specific value to be detected within the data by the correlators 304 in relation to the other bits of bytes 308. The second type of bit, however, is a do-not-care bit. The identity of the corresponding bit within the data does not matter for a do-not-care bit, and is unimportant for the detection of patterns within the data. These do-not-care-bits are defined based on the bitmask 324, 326 associated with patterns 316, 318, respectively.

For example, it may be known that a given type of unwanted computer code or information has a code section including a bit of particular value A, followed two bits down by a bit of particular value B. The bit in between the bits having the values A and B is of no consequence, however, and is unimportant to the detection of this type of code. Therefore, the corresponding bit within byte 308 of the pattern 316 is set as a do-not-care bit, to indicate to the correlators 304 that this bit is not actually used to detect the unwanted computer code or information within the data. A do-not-care bit, in other words, is a placeholder bit to specify the separation of other bits that are important in detecting patterns within the data. One notable use of this bit-wise operation is that for the English alphabet, represented by the ASCII character set (each byte holds one character), that the upper case characters are only one bit different than their lower case counterparts. Thus, one can make a pattern match case-insensitive by marking a certain bit within each byte as do-not-care bit.

The storage 310 stores one or more sets of parameters 320, 322. Each of the sets of parameters may be associated with one of the patterns 316, 318 stored in storage 302. For example, parameter set 320 may be associated with pattern 316, parameter set 322 may be associated with pattern 318, etc. Each set of parameters may include one or more parameters including a reference, start, stop, match location, match packet identification (ID) and match. Other parameters may be stored and associated with patterns 316, 318 in storage 302.

For example, with respect to parameter set 320, the reference parameter may provide an indication of the starting reference point in the data packet to look for pattern 316. The reference point may be, for example, layer 2, layer 3 or layer 4 header start, the match location of, or relative to, another pattern in storage 302, a packet payload, a particular location within the packet payload, etc.

The start parameter may provide a specific byte location with respect to the reference where the detector should start to look for the pattern 316. For example, the start parameter may indicate that the detector should start looking for pattern 316 four bytes after the reference parameter. This provides the opportunity to search data packets for patterns that have a known location within a data packet, or known location relative to interesting portions of the packet or earlier pattern matches. The stop parameter may provide a number of bytes after the start that the detector should look for pattern 316. By providing for the start and stop parameter, the detector can identify a window, or a range, of bytes where the detector will look for the pattern within a data packet. By providing for such a window or range, if the location of the unwanted computer code or information is known within a specific part of the data packet, the detector can focus on the known location of the unwanted computer code or information and not generate a "false positive" notification if the pattern is detected in non-interesting portions of the packet. For example, detector 104 may target specific known locations, such as 50-200 bytes after the layer 4 header, etc.

If pattern 316 is detected, the match location parameter stores the location within the data packet where the pattern was detected. The match location parameter may be referred to by a reference parameter associated with a different pattern. For example, the reference parameter of pattern 318 may refer to match location parameter of pattern 316. Thus, the detector may look for pattern 318 in a location that correlates to the location of pattern 316. By providing for this flexibility, complex strings of patterns may be detected. By providing for the reference parameter, the start parameter and the stop parameter, detector 104 may target specific known locations of unwanted computer code or information, such as 200-2000 bytes from the match location of pattern 316.

If pattern 316 is detected, the match packet ID parameter stores the ID of the packet where pattern 316 was detected. This may be used to ensure that the pattern matches of a plurality of patterns occur within the same packet, and not triggering on different parts of two different packets which happen to co-exist in the data pipeline at the same time.

If pattern 316 is detected, the match parameter stores an indication that a match was found.

By providing for this set of parameters, complex strings of patterns may be detected. For example, pattern X in the layer 3 header followed by pattern V in the layer 4 header followed by pattern Z in the packet's payload may be detected. Thus, false positives may be reduced as the detector may ensure that the patterns are being detected within the same data packet.

The correlators 304 search the data as the data moves through the pipeline. Correlators 304 are equal in number to the number of bytes in each row 202 of the pipeline 102. Therefore, in the example of FIG. 3, there are eight correlators 304, because there are eight bytes in each row 202 of the pipeline 102. The correlators 304 each detect whether the pattern portions of the pattern 316 are present within the data beginning in the row 204, but at different starting byte positions within the row 204. That is, the correlators 304A through 304H have starting byte positions corresponding to the positions of the bytes 208A through 208H within the row, and thus have unique offsets of zero through seven, respectively.

For example, the correlator 304A has an offset of zero and thus a starting byte position corresponding to the byte 208A of the row 204. Therefore, the correlator 304A detects whether the bytes 308A through 308I of the pattern 316 match the bytes 208A through 208I of the rows 204 and 206, where the bytes 208A through 208H are in the row 204 and the byte 208I is in the row 206. That is, the correlator 304A detects whether the byte 308A matches the byte 208A, whether the byte 308B matches the byte 208B, and so on, through whether the byte 308I matches the byte 208I. Each of these comparisons is masked by the "don't care" parameters on a bit-by-bit basis.

By comparison, the correlator 304B has an offset of one and thus a starting byte position corresponding to the byte 208B of the row 204. Therefore, the correlator 304B detects whether the bytes 308A through 308I of the pattern 316 match the bytes 208B through 208J. That is, the correlator 304B detects whether the byte 308A matches the byte 208B, whether the byte 308B matches the byte 208C, and so on, through whether the byte 308I matches the byte 208J. As such, whereas the correlator 304A determines whether the bytes 308 of the pattern 316 are present within the rows 204 and 206 starting at the byte 208A, the correlator 304B determines whether the bytes 308 are present within the rows 204 and 206 starting at the byte 208B. Similarly, the correlator 304C has an offset of two and so determines whether the bytes 308 are present starting at the byte 208C, the correlator 304D has an offset of three and determines whether the bytes 308 are present starting at the byte 208D, and so on.

Because the number of the correlators 304 is equal to the number of bytes in each row 202 of the pipeline 102, the correlators 304 can detect whether the bytes 308 of the pattern 316 are present in a corresponding sequence of bytes in the rows 204 and 206 (I.e., in the same order and with the same values), regardless of where the sequence starts within the row 204. If the sequence of the bytes 308 starts at the byte 208A in the row 204, then the correlator 304A detects the pattern 316, and if the sequence of the bytes 308 starts at the byte 208B in the row 204, then the correlator 304B detects the pattern 316. Similarly, if the sequence of the bytes 308 starts at a given byte 208C through 208H in the row 204, then the correlator 304C through 308H having a starting byte position corresponding to this byte in the row 204 detects the pattern 316.

In the example of FIG. 3, each correlator 304 detects whether the pattern portions of the pattern 316 are present within the data as that data spans both the rows 204 and 206 of the pipeline 102. However, in general, depending on the number of bytes 308 within the pattern 316 and the number of bytes within each row 202 of the pipeline 102, there may be no correlator that spans more than one row 202 of the pipeline 102. Alternatively, there may be one or more correlators that span two rows 202, or more than two rows 202, of the pipeline 102.

As indicated above, each pattern has an associated set of parameters. Thus, the correlators 304 may detect each of the patterns based on the parameters associated therewith. Correlators 304 may look for pattern 316 based on the associated reference, start and stop parameter. For example, if pattern 316 has a reference parameter indicating the start of the data payload, a start parameter of 1 byte from the start of the data payload and the stop parameter 200 bytes from the start parameter, the appropriate correlator(s) 304 can search at that window or range as defined in the associated set of parameters to detect pattern 316.

Each correlator 304 provides the number of bytes of the data that it has matched to the pattern 316, and the detector 104 indicates that pattern has been detected within the data based on this number of bytes of the data that have been matched to the pattern 316. For example, in one embodiment, only if a given correlator 308 matches all the bytes of the pattern 316 to corresponding bytes of the data does the detector 104 indicate that pattern has been detected. As other examples, and in other embodiments, a programmable threshold number of bytes, or a threshold percentage of the number of bytes matched in relation to the total number of bytes 308 within the pattern 316, may be employed to decide whether to indicate that pattern has been detected.

Different patterns may also be stored in the storage 302 as the pattern 316 at different times. As such, the correlators 304 can detect different patterns within the data moving through the pipeline 102 at different times. This may be useful where there is a large number of patterns against which to test the data, and where if one packet of data is infected with a given type of pattern, it is likely that other packets of data are infected with the same type of pattern, thus missing detection on some packets may be acceptable when pattern 316 is configured to look for a different pattern, as long as it can detect the pattern in a future packet once pattern 316 is restored to the pattern of interest. However, if it is known a priori that a given type of pattern is more dangerous or more prevalent at any given time, the pattern corresponding to this type of pattern may be retained within pattern 316, while at the same time other patterns corresponding to other types of patterns are rotated through, for example, pattern 318.

In one example, the bytes 308 for each pattern portion within the pattern 316 may have to be present within the same data packet of the data in the processing pipeline 102. In the example of FIG. 3, if the bytes 308A through 308D correspond to a given pattern portion, then just the correlators 304C through 304H are able to detect this pattern portion in such a situation, and not the correlators 304A and 304B. This is because the correlators 304A and 304D as to the four bytes 308A through 308D span two data packets, and not just the data packet 210. By comparison, the correlators 304C through 304H span just the data packet 210.

The comparison performed by the correlators 304 is relatively fast, because each correlator 304 just has to compare the data beginning at a corresponding starting byte position within the row 204 to the bytes 308 of the pattern 316. For example, one implementation of the correlators 304 may be a number of comparators equal to the total number of bits (as opposed to bytes) of the pattern 316. Therefore, although the detector 104 does not have the ability to delay movement of data through the pipeline 102 down the rows 202, this is not a hindrance to implementation, because the comparisons can be made quickly. Comparators are also relatively inexpensive hardware components to implement, particularly as compared to dedicated processors.

Device 104 further includes logic 312. Logic 312 may be implemented as a plurality of logic select blocks. The number of logic select blocks may correspond to the number of patterns stored in storage 302. The logic select blocks may be used to perform any logic operation, for example, AND, OR, NOT, NOR, XOR, XNOR, NAND, etc. Other, more complex, operations may be defined by stringing two or more of these logical operations together, for example, match pattern 1, and pattern 3 not pattern 5, etc. One or more functions may be defined using a user interface (not shown). The one or more functions may utilize the logic select blocks to perform logical operations based on the match parameter and the match packet ID parameter indicating whether or not a match of one or more of the patterns in storage 302 was found within the data as it moved through the pipeline. This provides the ability to search for complex patterns within the data of each packet as it passes through the data pipeline 102.

Figure 4:
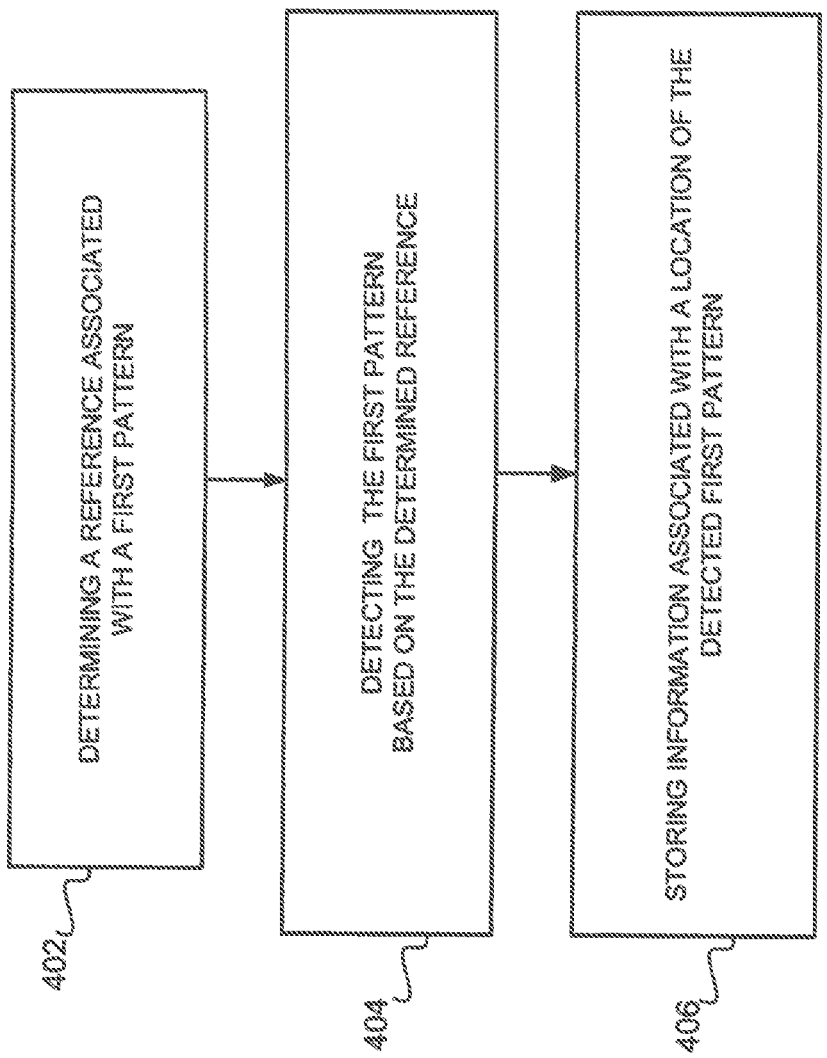
FIG. 4 is a flowchart of a method for detection, according to an embodiment of the present disclosure.

FIG. 4 depicts a flow diagram of a method 400 for performing pattern detection consistent with the description provided in relation to FIGS. 1-3. The detector determines a reference associated with a first pattern (402). As data is moved through the pipeline the detector detects within the data in the pipeline, the first pattern based on the determined reference (404). The detector detects the first pattern in parallel with the processing of the data as the data is moved through the pipeline and without delaying movement of the data into, through and out of the pipeline. The detector stores information associated with a location of the detected first pattern (406).

A determination that the pattern has been detected within the data may be based on the number of bytes of each overlapping portion of the data that have been matched to the pattern. For instance, if the pattern 316 matches any of the overlapping portions of the data within the pipeline 102 beginning at a starting byte position within the row 204 based on the associated reference parameter (viz., all the bytes 308 match corresponding bytes within the data in the same sequence as the bytes 308), then the pattern 316 has been detected. However, if the pattern 316 does not match any of the overlapping portions of the data within the pipeline 102 beginning at a starting byte position within the row 204, then in this example the pattern has not been detected.

Once the pattern has been detected, a byte location and packet identifying information identifying where the first pattern was detected is stored.

If the match location indicating the byte location of the match of pattern 316 is stored as a reference associated with pattern 318, the byte location of pattern 318 is used to look for pattern 318. Thus, pattern 318 may be detected based on the reference associated with pattern 318, namely, the match or byte location of pattern 316. If pattern 318 is detected, the byte location and packet identifying information identifying where pattern 318 was detected is stored.

A logical operation or function may be executed utilizing logical operators based on the detection, or lack of detection of the stored patterns.

We claim:

1. A device, comprising:
   a pipeline implemented at least in hardware, through which data is moved to perform processing of the data unrelated to pattern detection; and
   a detector implemented at least in hardware, to:
   detect a first pattern at a first location within the data, in parallel with the processing of the data as the data is moved through the pipeline and without delaying movement of the data through the pipeline;
   access a reference parameter that specifies a location that is relative to a location of the first pattern;
   determine a second location based on the reference parameter and the information identifying the first location; and detect a second pattern at the determined second location in the data.

2. The device of claim 1, further comprising:
a storage to store the first pattern and a bitmask associated with the first pattern, the bitmask identifying do-not-care bits of the associated first pattern, wherein the detector is to detect the first pattern based on bits other than the do-not-care bits.

3. The device of claim 1, wherein the detector is to store, in response to detecting the second pattern, information identifying the second location of the second pattern.

4. The device of claim 3, wherein the detector is to store packet identifying information identifying a packet when the first pattern was detected.

5. The device of claim 1, wherein the detector includes logic to perform an operation based on the detection of the first pattern and the detection of the second pattern.

6. The device of claim 1, wherein the processing of the data performed in parallel with the detecting of the first pattern includes modifying a network address of the data.

7. The device of claim 1, further comprising:
a storage to store the information identifying the first location in response to the detecting of the first pattern, the storage to further store the reference parameter and a further reference parameter providing an indication of a starting point in the data to look for the first pattern.

8. The device of claim 7, wherein the further reference parameter indicates the starting point in a header of a data packet to look for the first pattern.

9. The device of claim 1, wherein the data includes a data packet, and wherein the detecting of the first pattern and the detecting of the second pattern are performed in the data packet.

10. A method, comprising:
detecting, by a detector implemented at least in hardware, a first pattern within input data in a pipeline, the detecting being performed in parallel with processing of the input data as the input data is moved through the pipeline and without delaying movement of the input data into, through and out of the pipeline;
in response to the detecting, storing information identifying a first location of the first pattern in the input data;
accessing, by the detector, a reference parameter that specifies a location in data that is relative to a location of the first pattern;
determining, by the detector, a second location based on the reference parameter and the information identifying the first location; and
detecting, by the detector, a second pattern at the determined second location in the input data.

11. The method of claim 10, further comprising accessing, by the detector, a further reference parameter indicating a location in the input data to look for the first pattern, the indicated location located in a header of a data packet.

12. The method of claim 11, further comprising:
associating with the first pattern a starting point in relation to the location indicated by the further reference parameter and a stopping point in relation to the starting point to identify a window of data where the detector is to look for the first pattern.

13. The method of claim 10, further comprising:
performing a logical operation based on the detection of the first pattern and the second pattern.

14. The device of claim 9, wherein the detector is to indicate detection of at least one of a virus, a trojan, a worm, or spam in response to the detecting of the first pattern and the second pattern in the data packet.

15. The method of claim 10, wherein the processing of the input data performed in parallel with the detecting of the first pattern includes modifying a network address of the input data.

16. The method of claim 10, wherein the input data includes a data packet, and wherein the detecting of the first pattern and the detecting of the second pattern are performed in the data packet.

17. The method of claim 16, further comprising:
indicating detection of at least one of a virus, a trojan, a worm, or spam in response to detecting of the first pattern and the second pattern in the data packet.

18. A device, comprising:
a storage device to store
a plurality of patterns having a length of a predetermined number of bytes; and
a plurality of parameters, associated with the plurality of patterns, each of the plurality of parameters including a reference, a start and a stop identifying where to detect the associated each of the plurality of patterns; and
a plurality of correlators implemented in hardware and equal in number to a number of bytes of each row of a plurality of rows of a pipeline,
each correlator is to provide a number of bytes of data that have been matched to one or more of the plurality of patterns, and
each correlator having a unique offset to detect one or more of the plurality of patterns beginning at a different starting byte position of data within a given row of the pipeline; and
wherein one of the plurality of patterns is indicated as having been detected within the data based on the number of bytes of the data that have been matched to the respective pattern by each correlator.

19. The device of claim 18, wherein the reference identifies one of a plurality of layer headers, a packet payload, and a match location of a second one of the plurality of patterns, and wherein the start represents a starting point in a packet in relation to the reference, and the stop represents a stopping point in relation to the starting point to identify a window of bytes where each of the plurality of patterns may be detected.

20. The device of claim 19, further including logic to perform an operation based on the detected patterns.

* * * * *